Feb. 2, 1954   H. L. LA BAUME   2,668,270
VOLTAGE REGULATING SYSTEM
Filed June 7, 1950

INVENTOR.
H. L. LaBaume
BY
F. D. Copeland Jr.
AGENT

Patented Feb. 2, 1954

2,668,270

UNITED STATES PATENT OFFICE 2,668,270

VOLTAGE REGULATING SYSTEM

Hypolite L. La Baume, Toccoa, Ga., assignor to R. G. Le Tourneau, Inc., Peoria, Ill., a corporation of California Application June 7, 1950, Serial No. 166,565

10 Claims. (Cl. 322—27)

1

This invention relates to a voltage regulating system and more particularly to such a system which includes a generator, a variable load and a transformer including a primary, a secondary and a compensating winding, in which the transformer windings are so connected with respect to each other and to the load and generator field as to maintain a constant output voltage across the load circuit.

The primary object of this invention is to provide an improved voltage regulating system which will maintain a constant voltage with any load on the line up to the generated capacity for a given generator speed.

Another object is to provide a transformer for such a system which includes a reactor winding in a novel circuit combination with the primary and secondary windings so that the reactor will buck the induced current in the secondary to prevent it from exceeding a predetermined value.

A further object is to produce a transformer which provides a finesse of control which has been unattainable in prior systems.

These and other objects will be apparent from the following specification and drawing, in which.

Figure 1:
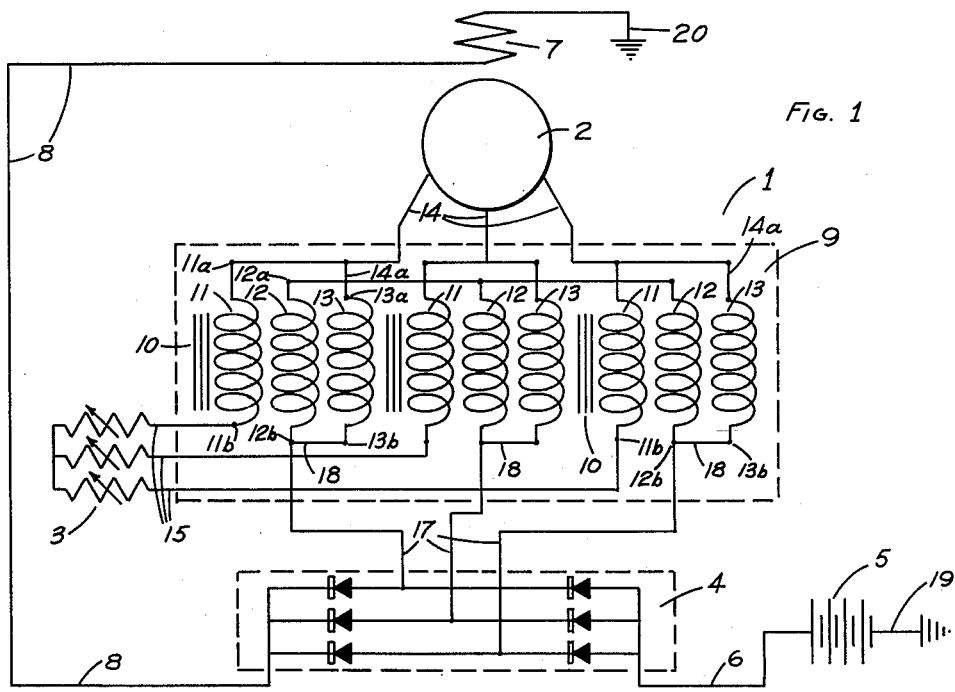
Fig. 1 represents a schematic arrangement of this system showing the improved transformer and the relation between the various windings of the transformer and between the transformer and external equipment in a typical three-phase circuit.

In the drawing, this system includes a three-phase reactor transformer, represented by numeral 1, interposed between an engine-driven generator 2 and a variable load 3. A rectifier 4 receives the regulated current from the transformer and directs this current together with D. C. current in line 6 from battery 5 to field 7 of generator 2 through line 8.

The overall voltage regulating system here is similar to that shown in co-pending application of Robert G. Le Tourneau, Serial Number 19,991 filed April 9, 1948, now Patent 2,531,062 and in granted Patent 2,482,588 (Le Tourneau). However, these devices did not have the precise control that is attainable with the invention at hand.

In the present device, the transformer 1 includes a laminated core 9 which contains three legs 10 upon each of which are three windings: a primary winding 11, a secondary winding 12, and a reactor winding 13. Each winding includes two

2 terminals designated by the suffixes a, and b. The generator output leads 14 carry current to the three primary windings 11 and by means of branch leads 14a connect with reactor windings 13. The output terminals 11b of the primary windings are then connected by means of leads 15 to load 3. The terminals 12a of secondary windings 12 are star connected by means of lead 16. The secondary output terminals 12b are connected by leads 17 to rectifier 4. The terminals 12b are also connected by leads 18 from terminal 13b of the reactor windings 13. The rectifier, as previously stated, is connected to and supplies exciter current to generator field 7. Both battery 5 and generator field 7 are grounded by means of lines 19 and 20 respectively.

It will be noted that primary winding 11 has the same polarity as the reactor winding 13, but the secondary winding 12 is of opposite polarity from these two windings. The polarity of a winding, of course, is a relative term but the two windings 11 and 13 may be said to have the same polarity, since the current produced by the generator 2 in these windings produces magnetic fluxes in the magnetic core 10 which are additive, i. e., the fluxes produced by the current in windings 11 and 13 thread the magnetic core in the same direction. On the other hand, a portion of such current flowing from one terminal of the generator through the winding 13, and returned to a second terminal of the generator through the secondary winding 12, flows through the secondary winding 12 in such a direction that the magnetic flux produced by such current in winding 12 acts in opposition to the flux established by the same current flowing through the reactor winding 13; therefore, windings 12 and 13 have opposite polarities, or these two windings considered together produce individual magnetic fluxes in the core 10 which buck one another.

The operation of this transformer and circuit may be observed in the following description. When there is no load at 3 and the generator 2 is delivering an E. M. F., there will be no amperage through the circuit of the primary windings 11 and leads 15. There will consequently be no transformer action due to the presence of the primary windings on legs 10. There will, however, be a current flowing through leads 14a and reactor windings 13 and through leads 18 and 17 into rectifier 4 from whence it emerges as D. C. current to excite field 7 and maintain the output voltage of generator 2. However, due to the connection between reactor windings 13 and secondary windings 12 due to lead 18, there will be a small amount of current flowing in windings 12 in a direction opposite to that in windings 13. The secondary winding and reactor winding are connected in a series circuit across terminals of the generator, so that, so far as such series circuit is concerned, the same current flows through the reactor winding as through the secondary winding; however, the fluxes produced by such current in the reactor and secondary windings oppose or buck one another, with the result that the flux produced by such current in such core is of relatively low magnitude. When a load is thrown in the circuit at 3, the current in leads 14 will then take the path through primary windings 11 and leads 15 due to the large number of turns of windings 13. The ratio of these turns for example in one embodiment were 510 in the reactor, 52 in the secondary, and 6 in the primary windings, using wire sizes of #17 round, #12 square, and two #4 square for the windings respectively. When a comparatively large current is passing through windings 11, transformer action takes place, and flux is generated in legs 10 and a corresponding current is developed in secondary windings 12 which is directed through leads 17 to rectifier 4 and thence back to generator field 2. However, here again, due to the connection between windings 12 and 13 (through leads 18) there will result a small current flow in windings 13 which will be in a direction opposite that in windings 12.

If this reactor winding 13 were not present or were not so connected, then the secondary would still deliver current to the rectifier for ultimately exciting the generator and building back the generator drop which would occur due to the load if the secondary were not so employed. However, what has happened is that the secondary supplies more current than is necessary at the moment and the generator output voltage then exceeds the rated value. This undesirable result is overcome by this transformer, which, while still supplying increasing exciter current to accommodate increased loads does so in conjunction with a check and balance means to prevent surges above that required to maintain a constant value.

This reactance and interthreading of flux generated in the various windings in actual practice resulted in a very delicately balanced control circuit in which the load voltage will remain constant from no load up to the generated capacity when the generator is run at a constant speed at or near its rated R. P. M.

Figure 2:
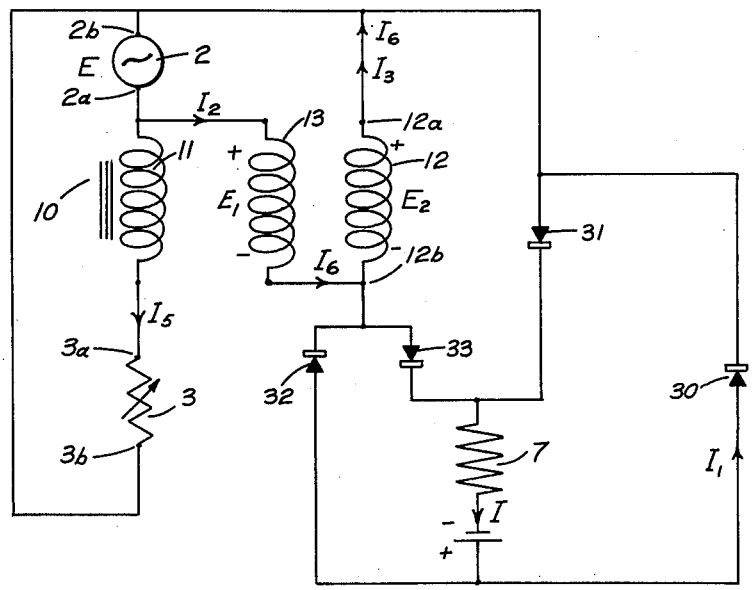
Fig. 2 represents a schematic diagram illustrating the principles and theory of this invention in a single-phase circuit.

The purpose, theory and functioning of the apparatus described above may perhaps best be illustrated in connection with the simplified arrangement shown in Figure 2. In Figure 2 the generator 2 is represented as a single phase generator connected, in accordance with important features of the present invention, to deliver a substantially regulated constant voltage across the terminals 3A, 3B of the variable load 3 over a wide range of load conditions. This voltage across the load 3 is maintained substantially constant by varying the direct current flowing through the field winding 7 of the generator 2.

The direct current normally flowing through the field winding 7 is represented by I, and such current I comprises essentially three components, namely, current components $I_1$, $I_2$ and $I_3$. Current $I_1$ is considered as due to the battery 5 and may be considered to flow from the positive terminal of source 5 through the rectifiers 30, 31, in turn, through the generator field 7 and returned to the negative terminal of the battery 5; a similar current flows from the positive terminal of the source 5 through the rectifiers 32, 33, in turn, and through the generator 7 to the negative terminal of the battery 5. The second current component $I_2$, a rectified current, flows from the terminal 2A (assuming that such terminal 2A is at this instant of positive potential with respect to its other terminal 2B) of source 3, through the reactor winding 13, through the rectifier 33, through the generator field 7, through the battery 5, through the rectifier 30 and then returned to the other terminal 2B of the generator 2.

The third current component $I_3$, also a rectified component, results from the voltage induced by the current flowing in the winding 11 into the secondary winding 12. Such current $I_3$ thus may be considered to flow from the upper terminal 12A of winding 12, through the rectifier 31, through the generator field 7, through the battery 5, and then returned to the lower terminal 12B of winding 12 through the rectifier 32.

It is observed that each one of these current components $I_1$, $I_2$ and $I_3$ flow in the same direction through the generator field winding 7 to produce additive effects therein.

Assuming that the magnitude of the load resistor 3 remains constant, the system operates such that when and as the load current $I_5$ tends to increase as a result of the tendency of the generator voltage E to increase, the current I flowing through the generator field winding 7 is reduced to reduce the amplitude of voltage E, to thereby maintain such voltage E substantially constant. Thus, assuming that the voltage E tends to raise, i. e., the load current $I_5$ tends to increase, an increased voltage $E_1$ is induced in the reactor winding 13 and an increased voltage $E_2$ is induced in the secondary winding 12 with polarities as indicated in Figure 2. While the effect of an increase of $E_2$ is to increase the amplitude of the current component $I_3$, simultaneously, the amplitude of the current component $I_2$ is decreased since it is observed that $E_1$ acts in opposition to the generator voltage E. Thus, while $I_3$ may increase, $I_2$ is decreased a sufficient amount such that the total current I represented by the algebraic sum of $I_2$ and $I_3$ is decreased to thereby, in turn, decrease the generated voltage E to thus overcome its tendency to increase. This result is increasingly apparent upon consideration of the fact that the voltage $E_1$, which acts in opposition to the generator voltage E is greater than the other induced voltage $E_2$ because of the fact that winding 13 comprises substantially more turns than the winding 12.

The above considerations are explained in an attempt to simplify the functioning and operation of the regulating system and, of course, there are other effects present in the circuit such as those produced due to mutual inductance between the various windings 11, 12, 13.

One of these effects which may be mentioned is the fact that a circulating current component $I_6$ flows in the serial circuit comprising the generator 2, the reactor winding 13 and the secondary winding 12. This current component $I_6$ flows even though there is no load current corresponding to $I_5$, i. e., $I_6$ flows even at no load. The effect of $I_6$ flowing through the coils 13, 12, of opposite polarities, is to diminish the flux in the core 10, to thereby effectively decrease the reactance of winding 13 for the flow of the component I₂ of generator field current. Other secondary effects may be noted; however, nothing substantial appears to result from more complete description of the functioning of this particular circuit.

From the foregoing description it will be readily seen that there has been produced such a device as substantially fulfills the objects of the invention as set forth herein.

While the specification sets forth in detail the present and preferred construction of this mechanism, still in practice such deviations from such detail may be resorted to as do not form a departure from the spirit of the invention as defined by the appended claims.

Having thus described the invention, the following is claimed as new and useful and upon which Letters Patent are desired:

1. In an electrical circuit including a generator having an armature winding and a field winding, a variable load, and a rectifier for supplying exciter current to said field winding, a transformer comprising a magnetic core and a primary winding serially connected between said generator armature winding and load, a secondary winding connected in circuit with said rectifier and said field winding and having current induced therein by transformer action when current is present in the primary winding, said induced current being delivered to said rectifier and then to said generator field winding for maintaining the generator output voltage constant under the variable load, and means including a reactor winding on said transformer connected in a serial circuit with said secondary winding, and said reactor and secondary windings producing magnetic fluxes of opposite directions in said magnetic core.

2. In an electrical circuit including a generator having an armature winding and a field winding, a variable load, and a rectifier for supplying exciter current to said field winding, a transformer having a magnetic core and a primary winding serially connected between said generator armature winding and load, a secondary winding connected in circuit with said rectifier and said field winding and having current induced therein by transformer action when current is present in the primary winding, said induced current being delivered to said rectifier and then to said generator field winding for maintaining a generator output proportional to the variable load, and means including a reactor winding on said transformer connected in bucking relationship to said secondary winding and connected in circuit with said generator armature winding to influence the induced current in said secondary winding and to prevent the voltage thereof from exceeding the value necessary for maintaining the generator output at constant value.

3. In an electrical circuit including a generator having an armature winding and a field winding, a variable load, and a rectifier for supplying exciter current to said field winding, a transformer having a magnetic core and a primary winding serially connected between said generator armature winding and load, a secondary winding connected in circuit with said rectifier and said field winding and having current induced therein by transformer action when current is present in the primary winding, said induced current being delivered to said rectifier and then to said generator field winding for maintaining a generator output proportional to the variable load, and a separate transformer winding connected in circuit with said generator armature winding and operative to induce a flux in said magnetic core in opposition to the flux produced by said secondary winding.

4. The combination of a generator having an armature winding and a field winding, three-phase output leads connected to said generator armature winding, a three-phase load, a three-legged transformer including primary, secondary and reactor windings on each core leg, each primary winding having two terminals, one primary terminal being connected to one of said output leads, the other primary terminal being serially connected through said three-phase load to a second one of said output leads, a rectifier connected in circuit with a secondary winding and said field winding, said secondary winding having current induced therein by transformer action when current is present in said primary winding, said induced current being directed through said rectifier to supply said generator field winding with an exciter current proportional to the load, each of said reactor windings having one of its terminals connected to a corresponding output terminal of said generator and the other one of its terminals connected to the junction point of said secondary windings with said rectifier and producing a magnetic flux in opposition to the flux produced by said primary winding in a corresponding core leg.

5. The combination of a generator having an armature winding and a field winding, three-phase output leads connected to said generator armature winding, a three-legged transformer including primary, secondary and reactor windings on each leg thereof, a variable three-phase load adapted to be supplied by said generator armature winding, a rectifier adapted to supply exciter current to said generator field winding, said primary windings being connected in series with said generator armature winding and load, said secondary windings being star connected with the noncommon terminal of the star connected secondary windings being connected through said rectifier to said field winding, corresponding reactor windings being connected in circuit with corresponding secondary windings across opposite terminals of said generator armature winding, and with corresponding reactor and secondary windings producing opposing magnetic fluxes in corresponding legs of said transformer.

6. In a system of the character described, a generator having an armature winding and a field winding, a battery, a rectifier, a variable three-phase load receiving current from said generator armature winding, a three-legged laminated magnetic core, primary, secondary and reactor windings on each leg of said core, each winding including two terminals, input leads connecting one terminal of each of said primary windings with corresponding terminals of the generator armature winding, the other terminal of each of said primary windings being connected to corresponding terminals of said load whereby said primary windings are serially connected between said generator and said load, said secondary windings being star connected with the noncommon terminal of each secondary winding being connected to one terminal of said rectifier, corresponding reactor windings being connected between one terminal of said generator and one of the noncommon terminals of the star connected secondary windings, with corresponding secondary and reactor windings producing opposing fluxes in corresponding core legs, said battery being serially connected with said field winding and with said rectifier means.

7. In a voltage regulating system of the character described wherein it is desired to maintain a constant voltage across a variable load, a transformer having a primary winding, a secondary winding and a reactor winding on a common core, a load circuit, an input voltage source, said voltage source, primary winding and load being serially connected, said voltage source comprising a generator with an armature winding and an associated field winding for regulating the voltage output of said voltage source, a rectifier, said secondary winding being connected in circuit with said rectifier and said field, said reactor winding being connected in circuit with said generator armature winding and producing a magnetic flux in said core in opposition to the flux produced by said secondary winding.

8. The invention defined in claim 7, characterized by the fact that said reactor winding and secondary winding are connected in a circuit across the terminals of said armature winding.

9. A regulating system of the character described comprising: an alternating current generator having an armature winding, a load circuit, a transformer having a primary winding, a reactance winding and a secondary winding, each of said windings being wound on a common magnetic core, a first serial circuit comprising said generator armature winding, primary winding and load circuit, a second circuit comprising said reactance winding, said secondary winding and said generator armature winding, said generator having a field coil, rectifier means, and a third circuit comprising said secondary winding, generator field coil and rectifier means, said primary and said reactance windings having the same polarity, and said reactance winding and said secondary winding having opposite polarities with respect to current flowing in said second circuit.

10. In a regulating system of the character described, a transformer having a primary winding, a reactance winding and a secondary winding, a generator having an armature winding, a load circuit fed by said generator armature winding, a first serial circuit comprising said generator armature winding, primary winding and said load circuit, a second circuit comprising said generator armature winding, reactance winding and said secondary winding, each of the aforementioned transformer windings having a common magnetic core, said reactance winding and said secondary winding being connected in said second circuit with opposite polarities whereby a current component flowing through said second circuit produces a corresponding pair of oppositely acting fluxes in said core, said generator having a field coil, a first pair of rectifiers connected in a third circuit with said field coil, a fourth circuit, a second pair of rectifiers connected in said fourth circuit with said field coil, said first pair and said second pair of rectifiers being poled for the flow of a unidirectional current in the corresponding third and fourth circuits, the junction point of said first pair of rectifiers being connected to one terminal of said secondary winding, the other terminal of said secondary winding being connected to the junction point of said second pair of rectifiers.

HYPOLITE L. LA BAUME.

References Cited in the file of this patent

UNITED STATES PATENTS

| Number | Name | Date |
| --- | --- | --- |
| 2,146,779 | Swanson | Feb. 14, 1939 |
| 2,448,028 | Gross | Aug. 31, 1948 |
| 2,448,925 | Sola | Sept. 7, 1948 |
| 2,482,588 | Le Tourneau | Sept. 20, 1949 |
| 2,531,062 | Le Tourneau | Nov. 21, 1950 |